United States Patent [19]
Rizzo et al.

[11] Patent Number: 4,753,689
[45] Date of Patent: Jun. 28, 1988

[54] METHOD OF CONDITIONING AN OBJECT OF SHAPE-MEMORY METALLIC ALLOY WITH TWO REVERSIBLE SHAPE-MEMORY STATES AND AN OBJECT THUS OBTAINED

[75] Inventors: Gilles Rizzo, Creteil; Alain Dubertret, Sevres; Gérard Guénin, Meyzieu, all of France

[73] Assignee: Souriau & Cie, Boulogne, France

[21] Appl. No.: 839,181

[22] Filed: Mar. 13, 1986

[30] Foreign Application Priority Data

Mar. 19, 1985 [EP] European Pat. Off. ........ 85400523.8

[51] Int. Cl.$^4$ .............................................. C22F 1/08
[52] U.S. Cl. ........................ 148/11.5 C; 148/11.5 N; 148/402; 200/266; 428/674; 428/680
[58] Field of Search ............ 148/402, 11.5 N, 11.5 C; 200/266; 439/161; 339/30; 428/674, 680

[56] References Cited

U.S. PATENT DOCUMENTS

| | | | |
|---|---|---|---|
| 3,906,623 | 9/1975 | Clabburn et al. | 29/628 |
| 3,985,950 | 10/1976 | Maltz | 174/88 C |
| 4,435,229 | 3/1984 | Johnson | 148/11.5 N |

FOREIGN PATENT DOCUMENTS

| | | |
|---|---|---|
| 0081372 | 6/1983 | European Pat. Off. |
| 0123376 | 6/1984 | European Pat. Off. |
| 0112618 | 7/1984 | European Pat. Off. |
| 1327441 | 8/1973 | United Kingdom |
| 1579734 | 11/1980 | United Kingdom |
| 2128039A | 4/1984 | United Kingdom |

OTHER PUBLICATIONS

French Search Report FR 85 04 040.
French Search Report FR 85 04 041.
French Search Report FR 85 04 042.
French Search Report FR 85 11 088.
"Shape Memory Effect, Superelasticity and Damping in Cu—Zn—Al Alloys" Report 78R1, Katholieke Universiteit Leuven, Belgium, by L. Delaey et al., Feb. 1, 1978.
IEEE Transactions on Components, Hybrids and Manufacturing Technology, vol. CHMT-3, Jun. 1980, pp. 226–232, IEEE, New York, U.S.
C. J. Evans, "Connector Finishes, Tin in Place of Gold." p. 226.

Primary Examiner—R. Dean
Attorney, Agent, or Firm—Stevens, Davis, Miller & Mosher

[57] ABSTRACT

The invention relates to a method of conditioning an object in shape-memory material of metallic alloy type. The object formed to final shapes and dimensions constituting the first shape-memory state is submitted to a thermal treatment in order to bring this object to an austenitic crystallographic phase, then to cooling. The object is then submitted in at least one deformation zone to a process of education consisting of imposing on the object, in at least one cycle, a series of thermal and/or mechanical stresses. The stresses are such as to lead to deformation of the object for bringing it to a shape close to its second shape-memory state in a martensitic crystallographic state, then to permit the return of the object to its first shape-memory state, on a return of the object to the austenitic crystallographic state.

Application to electric contact elements.

15 Claims, 6 Drawing Sheets

METHOD OF CONDITIONING AN OBJECT OF SHAPE-MEMORY METALLIC ALLOY WITH TWO REVERSIBLE SHAPE-MEMORY STATES AND AN OBJECT THUS OBTAINED

BACKGROUND OF THE INVENTION

The present invention relates to a method of conditioning an object made of shape-memory metallic alloy for the reversible memorisation of two shape-memory states, to the use of this method for objects made of metallic alloys of this type and to objects thus obtained.

The shape-memory effect for certain metallic alloys is already known in the state of the art and is the subject of numerous works as a result of which numerous publications have shown interest particularly in the mechanical art.

More recently, the coming to prominence of a double effect of reversible memory for this type of material has permitted the envisaging of an enlargement of its field of application.

The double effect of reversible memory of these materials has particularly been described in French patent application No. 2 413 159 in which objects with a double reversible shape-memory effect can be made from cold sintered powdered materials subsequently extruded at elevated temperature.

Although such objects have in fact a double reversible shape-memory effect, this does not apply to shaped objects so that the object, at least its memorised states, can be used only in restricted applications in which the object's global, change of shape, state alone can be utilised.

Further, the double reversible shape-memory effect has been described in French patent application No. 2 279 857. In this document the double reversible shape-memory effect is inherent in the method of manufacture of the article itself, so that this, or at least its memorised states, can be utilised only in restricted applications in which the global, change of shape, state of the article alone can be utilised.

THE INVENTION

The present invention has the object of remedying these mentioned inconveniences by providing a method and a use of this method capable of conferring, to any object made of metallic material having a phase transition in the solid state, able to acquire a memorisation of shape, pre-determined shape-memory properties, functions of a memorised shape state or initial shape of the object.

Another object of the present invention is to provide a method and a use of this method, capable of conferring, to any object made of a metallic alloy able to acquire a memorisation of shape, memorisation properties of pre-determined functions, which are obtained from a memorised shape state of the object or initial shape of the object and of the structure of it.

The method of conditioning of an object made of a material of the metallic alloy type with shape-memory for the reversible memorisation of two shape-memory states of the invention is remarkable in that it consists in submitting the object formed to the final shapes and dimensions, constituting a first shape-memory state, to a thermal treatment able to bring the object to an austenitic crystallographic phase state. The object is then submitted to cooling to a temperature in the region of ambient temperature, in a manner to avoid the appearance of a parasitic crystallographic phase. The object is then submitted in at least one zone to deformation of it in a process called education. The process of education consists of imposing on the said object, in at least one cycle, a series of thermal and/or mechanical stresses. The thermal stresses are adapted to bring at least one deformation zone into a martensitic crystallographic state or to return it to an austenitic crystallographic state. The mechanical stresses consist of applying either an external mechanical stress in a manner to deform the object, in the deformation zone, for bringing it into a shape close to its second shape-memory state, or an internal mechanical stress, obtained by holding the object in an intermediary shape state, close to the initial shape state and constituting the first shape-memory state of the object, in the course of returning to the austenitic crystallographic state.

The method of the invention finds application particularly in the mechanical art, the electro-mechanical art and/or the electronic art, in which beside the remarkable mechanical properties of these materials, their electrical properties can be used.

THE DRAWINGS

The invention will be better understood from reading the detailed description and from studying the following drawings, in which.

EMBODIMENTS OF THE INVENTION

The method of conditioning an object made of material of the shape-memory metallic alloy type, the object of the invention, permits the reversible memorisation of two states of shape-memory. This method is applicable to any object made of this type of material By any object, is intended semi-finished or intermediary products such as plates, ingots, wires or analogous shapes in which the mentioned materials are commercially available. By object, is also intended, any object fashioned with the aid of known working operations for this type of material, permitting the obtaining of complex functional shapes. The invention will now be described in connection with FIGS. 1a and 1b.

Figure 1A:
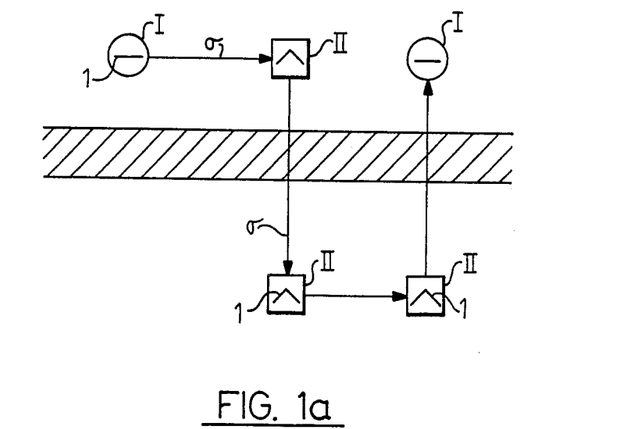
FIGS. 1a and 1b show different synoptic diagrams of the stages of the method of the invention.
Figure 1B:
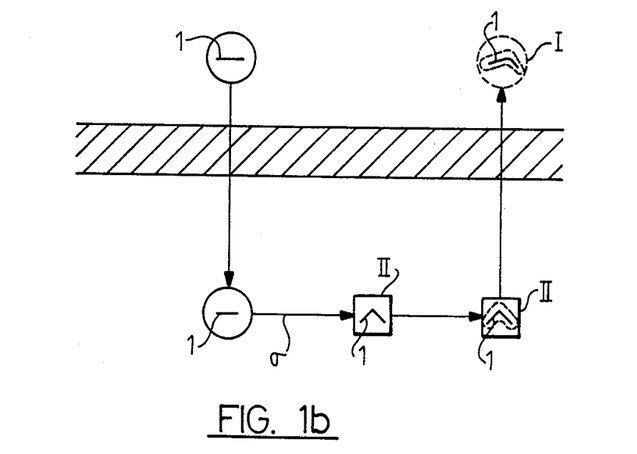

The object referenced 1 in the mentioned FIGS. is shaped substantially to the final shapes and dimensions able to constitute a first shape-memory state preliminarily to any conditioning operation proper. The object thus formed is then submitted to thermal treatment able to bring the entire object to a crystallographic phase state of the austenitic type. In the interest of simplification, the object in FIGS. 1a and 1b is shown in the form of a parallelepipedic ingot, the parallelepipede rectangle shape corresponding substantially to the final shapes and dimensions constituting the first shape-memory state. Consecutively, to the mentioned phase of thermal treatment, the object is submitted to cooling to a temperature in the region of ambient temperature. By way of non-limitative example, the thermal treatment capable of bringing the object to a austenitic type crystallographic phase state can be brought about by heating the object to a temperature of the order of 800° C. in neutral atmosphere, an atmosphere of argon for example. The cooling can be carried out in a non-limitative manner, by a treatment of the quenching type with water. In fact the cooling is carried out as a function of the alloy used in a manner to avoid the unwanted appearance of a parasitic crystallographic phase. The object having reached ambient temperature, it is submitted in at least one zone of deformation of its structure to a process called education.

The process of education consists in imposing, in at least one cycle, on the object, in at least one deformation zone of it, a series of thermal and/or mechanical stresses.

In FIGS. 1a and 1b, the application of a thermal stress is shown symbolically by the crossing of the crystallographic transition zone, shown by a hatched zone, between the austenitic and martensitic states. Similarly, the application of an external mechanical stress is shown by the symbol $\sigma$ and the representation of the object 1, bent in a rectangle, the object 1 being thus deformed. By application of external mechanical stress $\sigma$, the object 1 being in an austenitic crystallographic phase state in the case of FIG. 1a the same object 1 having been submitted to a thermal stress and then finding itself in the martensitic crystallographic state in the case of FIG. 1b, the object is deformed in the region of the mentioned deformation zone in a manner to bring it into a state or position of shape II close to its second shape-memory state. In the case of FIG. 1a the object from the shape state II is then submitted to a second thermal stress returning it to an austenitic type crystallographic state, the object 1 regaining a shape state close to its initial shape state designated I. On the contrary, in the case of FIG. 1b, an internal mechanical stress obtained by holding the object in an intermediary shape state close to the initial shape state and constituting the first shape-memory state of the object, is applied in the course of the return to an austenitic crystallographic phase. In FIG. 1b, the holding of the object symbolised by the closed contour around the object 1 deformed in the shape-memory state II in the martensitic state and then having been returned to its intermediary shape in a shape-memory state designated I, constituting in fact the first shape-memory state of the object.

By intermediary shape-memory state close to the initial shape state, is intended the return to this initial shape or to a shape close to it. For example, in the case of bending of a rod, the shape called intermediary can correspond to a return to the initial shape, at the local deformation, being able to attain 20%.

Naturally, in a non-limitative manner, each cycle thus shown in FIGS. 1a and 1b, can or may not be repeated in a manner to confer on the object a sufficient degree of precision of return to the first shape-memory state designated I. In the case of the process of education illustrated in FIG. 1a, this can consist of the repetitive application of corresponding stages, constituting a cycle, of 2 to 20 times for example.

Figure 2A:
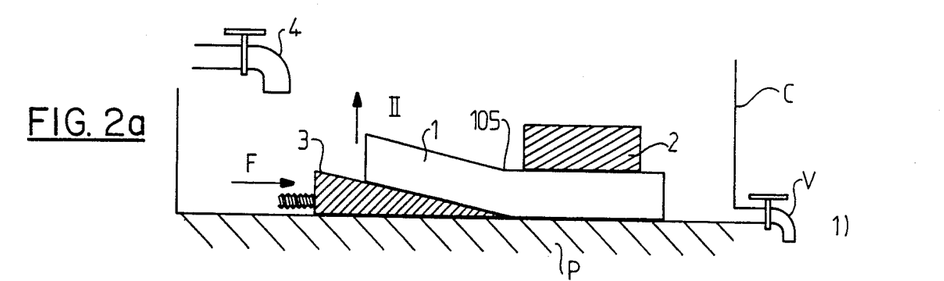
FIGS. 2a and 2b show respectively in 1,2,3 and 1,2,3, 4 an illustration of operation of the process of the invention according to the diagrams of FIGS. 1a and 1b respectively.

The method of the invention particularly in the case of operating the process of education according to FIG. 1a will be illustrated in an effective embodiment by means of FIG. 2a in 2a1, 2a2, 2a3.

In FIG. 2a the different stages of the process of education have been shown by way of non-limitative example. The object 1 constituted for example by the mentioned rectangular parallelepiped, is arranged in a vat C having a work surface P and fixed on this work surface P by any fixture means 2. A force shown by F is applied to the object by means of a wedge 3, which causes at the deformation zone 105, a mechanical stress such that the object is deformed in the zone 105, the object thus being brought into a shape position close to its second shape-memory state. The stress applied to the object to this end can be applied in a manner to deform the object in its elastic or plastic condition, or on the contrary in its super-elastic or rubbery condition, called the deformation plateau, as defined in the Doctorate of Science thesis published by G. Guenin, INSA Lyon (Institut National des Sciences Appliquees) in 1979. This position is designated II in FIG. 2a1. The stress being maintained, the object 1 is submitted to a lowering of temperature by means of for example a cold source represented by the valve 4. The cold source can consist, in an advantageous manner, of liquid nitrogen The lowering of temperature imposed on the object 1 in its shape state II permits bringing the object to the martensitic phase state as shown in FIG. 2a2. The lowering of temperature can be brought about either by bringing the object to a temperature less than Ms (the temperature Ms being the temperature at which the martensitic phase begins on its own to be formed), or to a temperature Ms$\sigma$, (the temperature Ms$\sigma$ being the temperature at which the martensitic phase begins to be formed in the presence of stresses), or preferably to a temperature lower than the temperature Mf (the temperature Mf being the temperature at which the totality of the alloy is transformed into the martensitic phase).

Then as shown in FIG. 2a3, the progressive reheating to ambient temperature of the object 1 is obtained by emptying of the vat C by opening of a valve V and withdrawal of the wedge 3. On reheating, the object 1 returns to a shape or shape-memory state very close to the initial state designated I.

For example, the thermal treatment capable of bringing the object 1 to an austenitic type crystallographic phase state is held, the temperature of 800° C. being reached, during a period of 1 to 45 minutes. The holding time of the mentioned thermal treatment in fact influences the grain structure and one obtains, as a function of the holding time, a monophase crystallographic system with a larger or smaller texture.

Figure 2B:
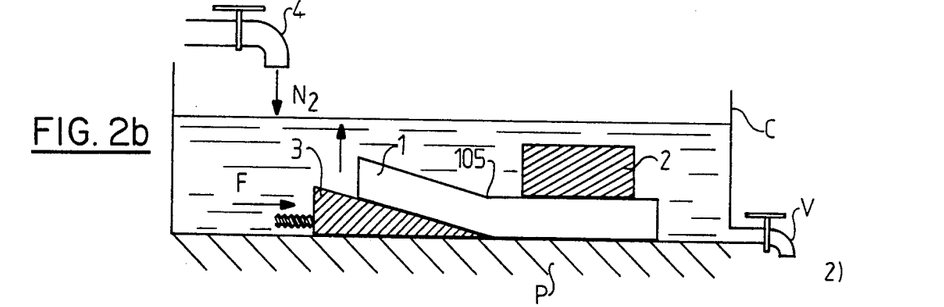
Figure 2C:
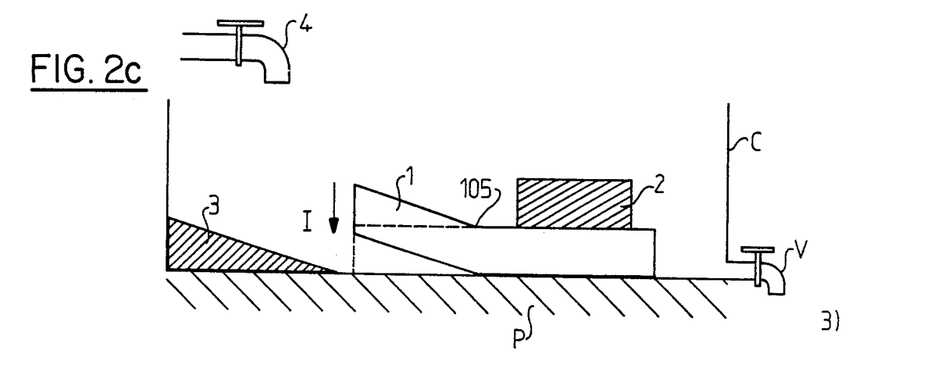
FIG. 2c shows a diagram of forces applied to the object in the course of the method according to the invention.

Further, as shown in FIG. 2c, the stress $\sigma$ applied at the deformation zone 105 is such that the strain $\epsilon$ obtained is in the condition (2) called the plateau of deformation of the material making up the object. Preferably, the stress and the deformation applied in the zone 105 correspond to a point in the condition (2) close to the region (3), when the object or deformation zone is at a temperature less than the temperature Mf of the end of the martensitic transition or at a temperature greater than the temperature Ms of the beginning of the martensitic transition, but less than the temperature Md, the temperature at which the first martensitic needle appears in the material when it is submitted to a stress. In FIG. 2c, at B and C the zones 2 on the stress-strain graphs GC, GB correspond, in the mentioned temperature and stress conditions, to conditions of pseudoelasticity defining the deformation plateau. On the contrary, in the case where the object is at a temperature greater than the previously defined temperature Md, as shown in FIG. 2c at A on the stress-strain graph GA, the stress applied during the process of education is such that the object is deformed at the deformation zone 5 in its elastic condition 1, a slight overlapping into the plastic zone 2 being able to be accepted.

In FIG. 2a, at 2a1 and 2a2, has been shown the application of the stress to the object 1 by means of a wedge. The mechanical stress applied to the object 1 can of course be applied in the course of shaping, stamping or any mechanical means.

The method of the invention will be further illustrated in the case of operating the process of education, in accordance with the diagram of FIG. 1b, by means of FIG. 2b, at 2b1, 2b2, 2b3 and 2b4.

The material necessary for the operation of the process of education in accordance with FIG. 1a, which has been described in connection with FIG. 2a, can be used for operation of the process of education according to the diagram of FIG. 1b and the elements of FIG. 2b having the same references as the elements shown in FIG. 2a are identical to the latter.

According to FIG. 2b, the object 1 constituted as an ingot for example is fixed thanks to means 2 on the work surface P. A thermal stress consisting of a variation of temperature able to bring the object 1 or the deformation zone of it to the martensitic crystallographic phase is firstly imposed in the absence of deformation. In FIG. 2b1, the vat C is for example filled with liquid nitrogen, the object being covered by it. It is recalled that the shape of the object 1 in this state is the initial shape Then, as shown in FIG. 2b2, an external mechanical stress is imposed on the object 1, in this crystallographic state, at the level of the deformation zone 105 so that the object is deformed in this zone, in its condition called the deformation plateau, in a manner to bring the object 1 into a shape position designated II in FIG. 2b2 close to its second shape-memory state. This stress can be applied by means of the wedge 3. Then an intermediary shape state close to the initial shape state is subsequently defined and imposed on the object 1. The intermediary shape state is imposed on the object 1 by the imposition of limits of subsequent change of shape of the object to limits corresponding to the intermediary shape state. In FIG. 2b3, the definition and imposition of the intermediary shape state on the object 1 has been shown schematically by a structure or mechanical envelope 5, closed or not, surrounding the object 1 and able to permit return of the object 1 to a shape state close to the initial state and so called intermediary shape state. It is understood that the positioning of the object 1 in the mechanical envelope 5, the object 1 being disengaged from the fixing means 2, can be carried out in the liquid nitrogen bath or, the passage of the object from the liquid nitrogen bath to free air in the mechanical envelope 5 being rendered minimal and the thermal inertia of the object 1 being sufficient, this positioning can be carried out outside the liquid nitrogen bath. The object 1 to which the limits of change of shape have been imposed is then submitted to a new thermal stress consisting of heating to ambient temperature for returning the object 1 to the austenitic type crystallographic phase state. The reheating of the object 1 and the holding of it in the intermediary shape permit introducing of internal stresses permitting the definition of the intermediary phase state as the first shape-memory state designated I, in FIG. 2b4 where the liquid nitrogen bath has been emptied. The return to austenitic state in the form of the imposed intermediary shape $\epsilon i$ is accompanied by development of significant internal stresses $\sigma \tau$ as shown diagrammatically in FIG. 2c at C.

By way of non-limitative example, the intermediary shape state, is defined and imposed on the object by means of a matrix constituting the mechanical envelope 5. The matrix can for example be constituted in stainless steel and must have a mechanical structure itself permitting resistance to return of the object 1 to the austenitic crystallographic state, which is accompanied by the development of significant internal stresses, which by reaction, are applied on to the walls of the matrix. The dimensions of the matrix and the position of the object 1 in the matrix are chosen in a manner that the greatest dimensions of the object in its intermediary shape state correspond to the greatest internal dimensions.

The mentioned process of education can or may not be repeated for a plurality of cycles. It has with respect to the process of education or cycle defined according to FIG. 1a, the advantage of a greater precision of deformation and return to the shape-memory state I. Any combination of processes of education such as defined in connection with FIGS. 1a, 2a and 1b, 2b in view of conferring two memorised shape-memory states on the shaped object do not depart from the scope of the present invention.

An example of an embodiment of shaped objects able, in an advantageous manner, to be submitted to the method of conditioning of the invention, will now be described in connection with FIG. 3.

The constituent material of the shaped object and consisting either of a sheet, a cylindrical ingot, or a tube for example, is first submitted to a treatment at high temperature in a manner to bring the material to a crystallographic state in which the material is rendered mallable. The stage of treatment at high temperature consists of bringing the said material to a temperature of the order of 500° C. or to a temperature permitting bringing the material into a state adapted for convenient shaping. This heating can equally preferably be carried out in a neutral atmosphere, under pressure of argon. Successively to the treatment at high temperature, the material is then submitted to a cooling to a temperature in the region of ambient temperature. This rapid cooling can also be carried out by the phenomenon of the quenching type in water. As a function of the material and the composition of the metallic alloy of it, the quenching type treatment can possibly be replaced by cooling by a gas jet, which causes cooling after treatment at high temperature, or after thermal treatment able to bring the object to an austenitic crystallographic phase state. The material thus treated after the mentioned treatments, is then in a state where the internal stresses are suppressed and in which it is rendered more malleable and where it is has substantially lost any trace of memory of previous shape. The material can then be shaped by milling, shaping, turning, stamping, rolling or such-like for obtaining the final use shape, which will correspond to the stable memory state substantially at the use temperature.

Further, on thermal treatment and the mentioned elevated temperature, the first shape of the material can be held until this state of zero internal stress of the material is obtained, permitting in it reduction of the effects of parasitic shape-memory. In fact, on operation of the mentioned stage, for a material in the form of a band or rod, this operation in fact reverts to the effecting of an education of the material having the effect of reducing the parasitic shape-memory effects in permitting only a possible final change of shape in a principal direction, the longitudinal dimension for instance of the band or the rod.

Figure 3A:
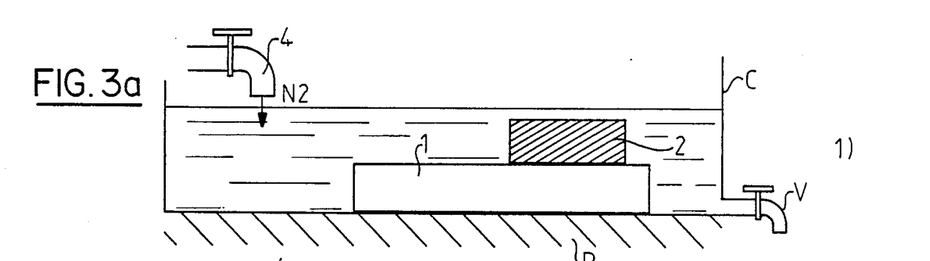
FIG. 3 shows at a,b & c different embodiments of an object able to be submitted to the method of the invention.
Figure 3B:
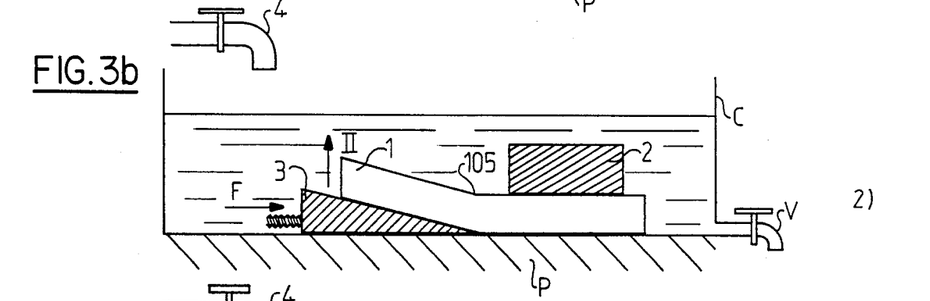
Figure 3C:
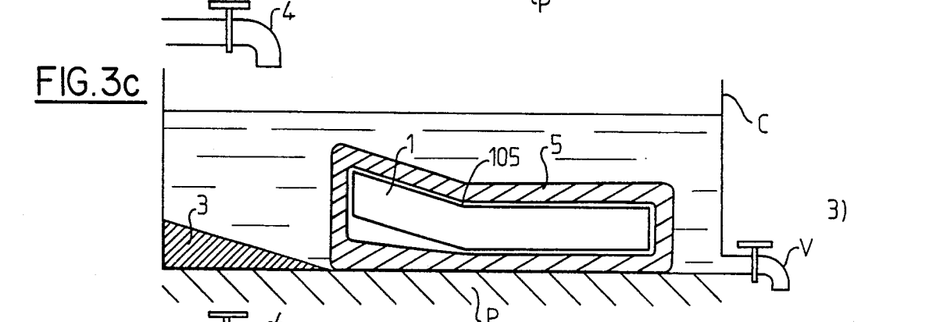
Figure 3D:
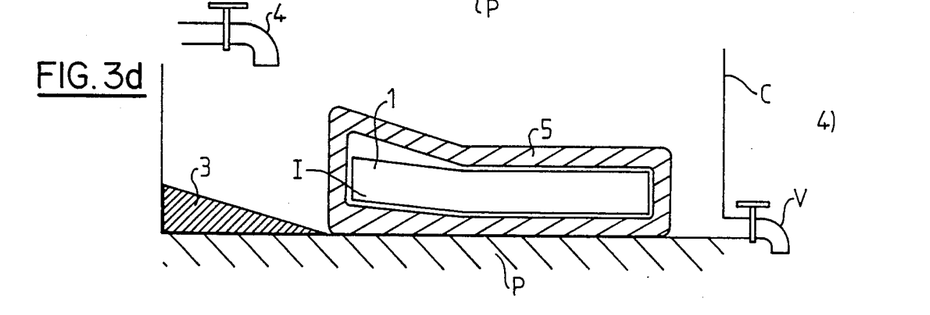

Examples of shaping of the object will now be given expressly by means of FIG. 3. The previously treated material can consist of a cylindrical tube as shown in FIG. 3a, a rod or cylindrical ingot as shown in FIG. 3b, a metallic sheet as shown in FIG. 3c1. The tube or rod can be milled in a manner to provide respectively one or two lateral slots arranged along part of their length. The metallic sheet shown in FIG. 3c1 can be stamped to dimension, with the dashed parts being removed, then rolled in a manner to substantially form a tube having for example a lateral slit along its entire length, as shown in 3c2. The shaped objects thus described in a non-limitative manner can then advantageously be submitted to a process of education previously described. The wedge permitting application of stress in the deformation zone, can advantageously be replaced by a male or female cone, as a function of the position or second final memory state to be obtained, and of the nature of the object to be educated or any other tool adapted for this effect.

Examples of metallic alloys especially adapted for operation of the process and to the fabrication of shaped objects, educated or not, will now be given in a non-limitative manner. By metallic alloys, is intended in fact composition used in this form, or inter-metallic composition, or in alloyed form. Preferably, the mentioned compositions are compositions of the nickel-titanium group having substantially 50% titanium and 50% nickel, as well as compositions with additions such as of cobalt, copper, aluminium, permitting modifying certain parameters of the final material for example the temperature of transition Ms and/or the mechanical and electrical properties, nickel-titanium-iron having substantially 50% titanium, 47% nickel and 3% iron, zinc-copper-aluminium, having substantially 4% ±0.5% aluminium, 27 to 29% zinc, the rest of the percentage being constituted by copper. The percentages indicated are atomic percentages. The mentioned percentages permit by judicious choice of the different components, determining with a good degree of precision the transition temperature Ms of the alloy concerned. Trials carried out with a composition comprising 4% aluminium, 28% zinc and the balance of copper have permitted obtaining a transition temperature Ms substantially equal to −80° C. Of course, the mentioned compositions are not limitative; there can particularly be added the tertiary composition copper-aluminium-nickel, which permits obtaining shaped objects, educated or not, having a better resistance to corrosion and to ageing.

Figure 4:
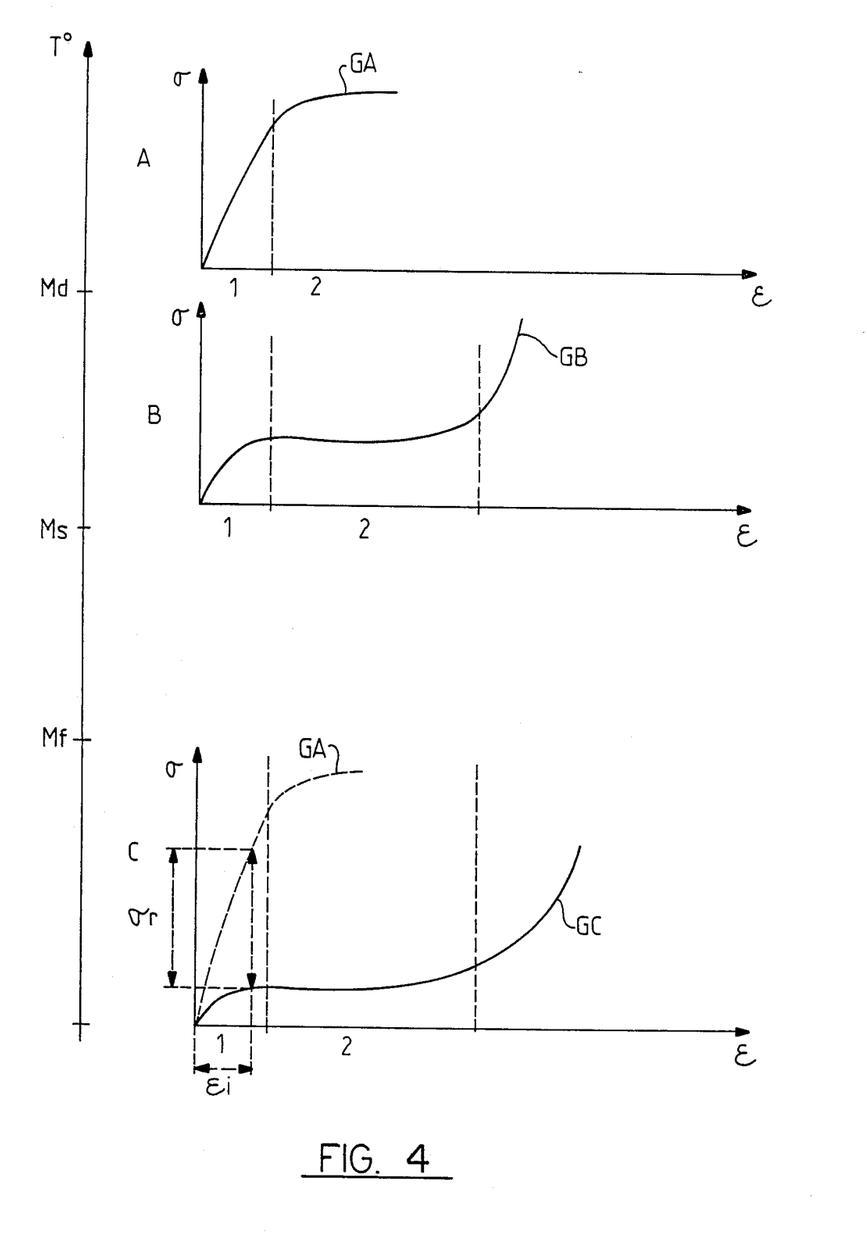
FIG. 4 shows an object obtained following operation of the method of the invention.
Figure 5A:
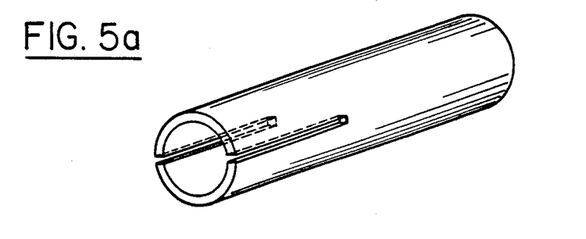
Figure 5B:
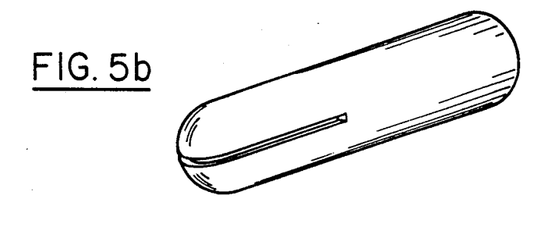
Figure 5C:
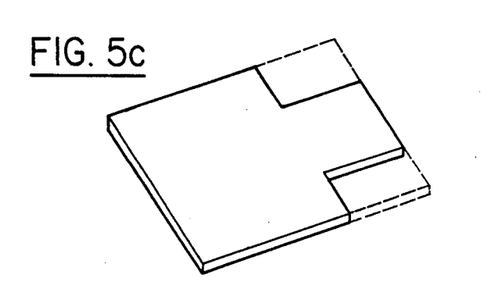
Figure 5D:
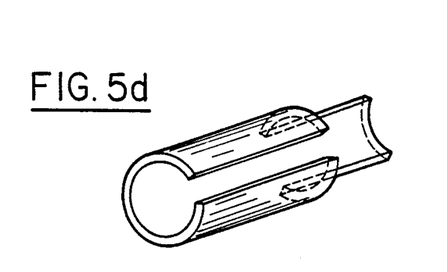
Figure 6A:
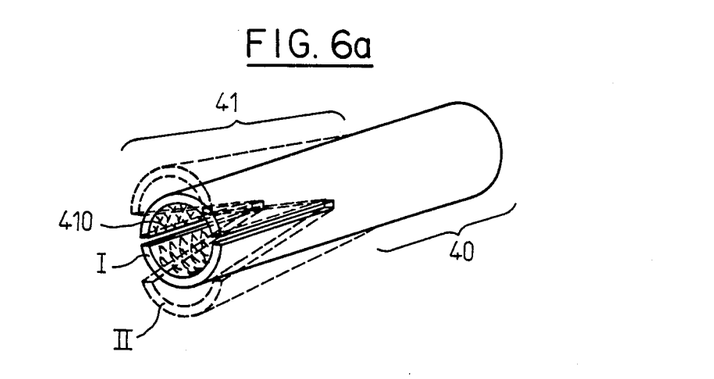
Figure 6B:
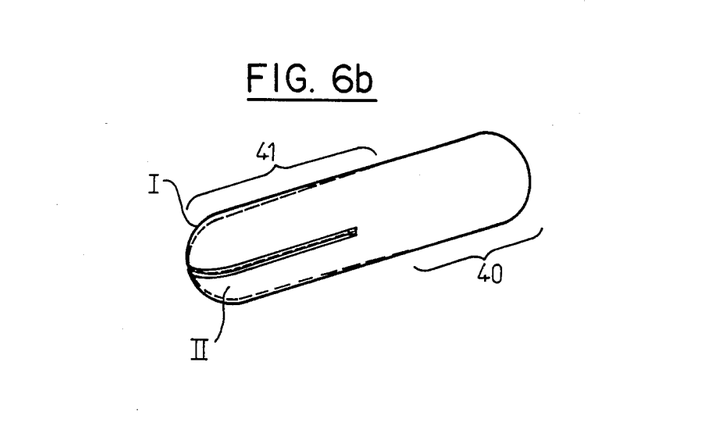

Examples of objects obtained in the operation of the method of the invention will now be given in the very advantageous application to electrical contact elements by means of FIG. 4. As shown in FIG. 4, the female a or male b electrical contact element has a fixed part 40 intended to receive a first electric circuit element to be connected and an active contact part 41. The active contact part 41 is movable between two positions designated I, II, ensuring respectively the existence or the breaking of contact pressure with a second circuit element on which the female a or male b part can be plugged. The contact element as shown, corresponds for example to the object shaped as described in FIG. 3a and FIG. 3b respectively. It is of a shape-memory material and has been educated in accordance with the method of the invention, in order to possess two reversible memorised shape-memory states, corresponding to the positions I, II.

In this particular case, in operation of the method of the invention for making electric contact elements, the process of education as defined in accordance with the diagram of FIGS. 1b and 2b will be advantageously preferred particularly as a result of the better precision in the degree of return to the shape states I, II. Further, and in a preferred manner, the object 1 constitutes a male or female contact element of which the first shape-memory state designated I, corresponds substantially to the intermediary shape state and of which the second shape-memory state designated II, corresponds to the object after deformation applied to the deformation zone, when the internal dimensions of the matrix, or mechanical envelope 5, are equal to the dimensions of the female or male contact element in its memorised shape-memory state I corresponding to the intermediary shape state.

This process of education thus appears particularly adapted to the field of connectors, the matrix being able to be constituted either by a copy of the corresponding female or male contact element, or by this contact element itself. The shape-memory material, in a non-limitative manner constituting the contact element comes from the group nickel-titanium, nickel-aluminium, nickel-titanium-iron, copper-zinc-aluminium, copper-aluminium-nickel. Trials carried out particularly with contact elements, with a structure as shown in FIG. 4, have permitted ensuring a quite sufficient reproducability of use by transition between the shape states I and II greater than 100 cycles of use, for an education consisting of a repetition of the process called education, defined according to the diagrams of FIGS. 1a and 2a not exceeding a few units. Thus, the method of the invention is particularly remarkable in that, from shapes of a shaped object, pre-determined in a manner to be able to constitute a first state of shape-memory of the object, it permits, by a judicious application of the process to the object or to a preferential point of the object, an education of this object, itself conferring properties of memorisation of two pre-determined states of shape, which in connection with the mechanical structure of the object, these physical properties, its conductability, permit in fact an education of function, here the function of connection-disconnection or even of commutation. The method of the invention is distinguished in this from previous methods in that, particularly, the education no longer comes from a structural education connected to a single global deformation of the object, but in a localised education, able in this as a function of the characteristics as such of the object, to be rendered functional.

It will be particularly understood, that in the application previously described to an electric contact element, the sole command of lowering the temperature of the object below the transition temperature Ms of its material, permits immediate passage to the position II or the second shape-memory position, the position permitting, the contact being broken, easy disconnection. The return of the contact element to a temperature above the temperature Ms then permits the return to the initial shape-memory position or first position. Finally it should be noted, that the female a or male b contact elements can or may not be educated in a complementary manner. By complementary state, is intended in the mentioned example, opposite variations of spatial positions of movable parts of the female a or male b elements, for the same lowering or the same increase in temperature, below or above the transition temperature.

Further, the contact elements thus obtained can be provided with a conductive protecting covering, consisting in the deposit of gold, silver, tin-lead or palladium alloy. An appropriate underlayer can also be provided. Finally, the electric contact element according to the invention, can be provided at its active contact part 41, with roughness 410 able to permit achieving of contact on an insulated conductor by displacement of the insulant. The lead-tin covering can in fact be used to enlarge the normal field of use, since there practically no longer exists the problem of friction nor of wear at each contact element.

Shaped objects made in a shape-memory metallic alloy obtained by operating the method of the invention are remarkable in that they have a first shape-memory state corresponding substantially to the initial shape of the object obtained by traditional machining operations, then a second shape-memory state, different from the first, is obtained from this latter by local modification of the first shape in at least one point or zone of the structure of this object. This modification and the reversible passage from one shape-memory state to the other are obtained by modification of the temperature at least of the corresponding zone or zones of the structure of the object. The utilisation of such objects is not limited to the field of connectors. In particular, the mentioned reversible modification of shape of such objects can advantageously be used in connection with other physical parameters of these, such as conductability, mechanical resistance or others, in order to confer on them new functions of which the essential characteristic is functional autonomy. By functional autonomy, is intended the absence of the necessity of direct intervention by an operator in order to operate these said functions, this intervention coming down to merely modification of temperature. Such functional autonomy is particularly adapted to the use of such objects in hostile environments in which the presence of an operator is excluded for example in an environment of very high intensity ionising radiation.

We claim:

1. A method of conditioning an object of shape-memory metallic alloy material for the reversible memorisation of two shape-memory states, said alloy material having a transition temperature from austenitic to martensitic states consisting in the steps of:
    submitting said object, formed to final shapes and dimensions constituting a first shape-memory state, to a thermal treatment able to bring said object to an austenitic type crystallographic phase state,
    submitting said object to cooling to a temperature in the region of a temperature greater than said transition temperature, in a manner to avoid the appearance of a parasitic crystallographic phase,
    submitting said object, in at least one deformation zone of it, to a process called education consisting of imposing on said object, in a plurality of cycles, a mechanical stress such that it is deformed, in said zone, in a manner to bring said object into a shape position close to said second shape-memory state and submitting said object, said stress being maintained, to a lowering of temperature able to bring said object into a martensitic phase in the deformation plateau condition, then, said stress being removed, submitting said object to a progressive heating for returning it to an austenitic crystallographic phase state.

2. A method of conditioning an object of shape-memory metallic alloy material for the reversible memorisation of two shape-memory states said alloy material having a transition temperature from austenitic to martensitic states, consisting in the steps of:
    submitting said object, formed to final shapes and dimensions constituting a first shape-memory state, to a thermal treatment able to bring said object to an austenitic type crystallographic phase state,
    submitting said object to cooling to a temperature in the region of a temperature greater than said transition temperature, in a manner to avoid the appearance of a parasitic crystallographic phase,
    defining for said object an intermediary shape state, and imposing limits of subsequent change of shape on said object to limits corresponding to said intermediary state of shape,
    submitting said object, in at least one deformation zone of it, to a process called education wherein said process of education consists in;
    imposing on said object or at least said zone of it a thermal stress consisting of a variation of temperature able to bring it to a martensitic crystallographic phase state,
    imposing on said object at the level of said zone, in said state, a mechanical stress such that said object is deformed, in said zone, in its deformation plateau condition in a manner to bring said object into a shape position close to its second shape-memory state,
    submitting said object to which said limits of change of shape have been imposed to a progressive reheating for returning it to an austenitic type crystallographic phase state, in a manner to introduce into said zone of deformation of said object, from said reheating and the holding of said object in said intermediary shape, said internal stresses permitting the definition of said intermediary shape state as the first shape-memory state, and
    removing any external stress on said object while maintaining said austenitic type crystallographic phase state.

3. A method according to claim 2, wherein said intermediary shape state is defined and imposed on said object by means of a matrix, the dimensions of said matrix being chosen and said object being placed in said matrix in a manner that the greatest dimensions of said object in its intermediary shape state correspond to the largest internal dimensions of said matrix.

4. A method according to claim 3 wherein in the case of its operation for producing a contact element, said object constitutes a male or female contact element of which its first shape-memory state corresponds to its intermediary shape state and of which its second shape-memory state corresponds to said object after deformation applied to said deformation zone, the internal dimensions of said matrix being equal to the dimensions of the corresponding female or male contact element.

5. A method according to claim 1 or 2, wherein in the case of shaped objects, said method consists in, preliminarily to said stage of thermal treatment able to bring said object to an austenitic type crystallographic phase, submitting the material of said object to a treatment at high temperature in a manner to bring the material to a crystallographic state, in which internal stresses are removed, submitting said material to a cooling in the region of ambient temperature, shaping said material previously treated to the final shapes and dimensions constituting a first shape-memory state at the use temperature.

6. A method according to claim 5, wherein on thermal treatment at high temperature, said first shape of said material is held until the state of zero internal stresses of said material is obtained thus permitting the reduction of parasitic shape-memory effects.

7. A method according to claim 1 or 2, wherein during the stage in which said object is submitted to thermal treatment able to bring it to an austenitic phase, said object is brought to a temperature in the region of 800° C. and maintained at this temperature between 1 and 45 minutes.

8. A method according to claim 1 or 2, wherein said step consisting in submitting said object to a cooling and to a temperature close to the ambient temperature is carried out by a quenching type treatment.

9. A method according to claim 1 or 2, wherein during said process of education, said application of said mechanical stress is carried out by deformation of said object.

10. A method according to claim 1 or 2, wherein during said process of education, said variation of temperature is carried out in a manner to bring said object to an internal temperature lower than its temperature Mf of the end of martensitic transition, said variation of temperature being able to bring at least said zone or zones of deformation to the martensitic state.

11. A method according to claim 1 or 2, for the conditioning of an object of shape-memory type metallic alloy material from the group nickel-titanium, nickel-titanium-iron, copper-zinc-aluminium, copper-aluminium-nickel, nickel-aluminium.

12. An electric contact element comprising a fixed part intended to receive a first electric circuit element to be connected and an active contact part, movable between two positions (I, II), ensuring respectively the existence or the removal of contact pressure, wherein said contact element is constituted in a shape-memory material having two memorised shape-memory states corresponding to said positions.

13. An electric contact element according to claim 12, characterised in that said shape-memory material is constituted by a shape-memory metallic composition from the group nickel-titanium, nickel-titanium-iron, copper-zinc-aluminium, copper-aluminium-nickel, nickel-aluminium used in intermetallic composition form or in alloyed form.

14. An electric contact element according to claim 13, comprising a conductive protecting cover constituted by a layer of gold, of silver, of an alloy or palladium or of a tin-lead composition, said protective covering being able in addition to have an appropriate underlayer.

15. An electric contact element according to claim 12, wherein said active part of said contact has roughness able to permit achieving contact by displacement of an insulant.

* * * * *